United States Patent
Wang et al.

(10) Patent No.: US 9,717,022 B2
(45) Date of Patent: Jul. 25, 2017

(54) METHOD FOR DYNAMICALLY ADJUSTING CHANNEL BANDWIDTH IN WIRELESS COMMUNICATIONS SYSTEMS

(71) Applicant: MediaTek Singapore Pte. Ltd., Singapore (SG)

(72) Inventors: Chao-Chun Wang, Taipei (TW); Chih-Shi Yee, Baoshan Township Hsinchu County (TW); Jianhan Liu, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 96 days.

(21) Appl. No.: 14/651,435

(22) PCT Filed: Dec. 12, 2013

(86) PCT No.: PCT/CN2013/089243
§ 371 (c)(1),
(2) Date: Jun. 11, 2015

(87) PCT Pub. No.: WO2014/090179
PCT Pub. Date: Jun. 19, 2014

(65) Prior Publication Data
US 2015/0312804 A1    Oct. 29, 2015

Related U.S. Application Data

(60) Provisional application No. 61/736,193, filed on Dec. 12, 2012, provisional application No. 61/767,878, filed on Feb. 22, 2013.

(51) Int. Cl.
*H04W 4/00* (2009.01)
*H04W 28/20* (2009.01)
(Continued)

(52) U.S. Cl.
CPC .......... *H04W 28/20* (2013.01); *H04L 1/1614* (2013.01); *H04L 5/0055* (2013.01); *H04W 72/0453* (2013.01); *H04W 84/12* (2013.01)

(58) Field of Classification Search
CPC . H04W 28/20; H04W 72/0453; H04W 84/12; H04L 1/1614; H04L 5/0055
See application file for complete search history.

(56) References Cited

U.S. PATENT DOCUMENTS 8,619,640 B2 * 12/2013 Park .................. H04W 72/082
                                                        370/230
9,036,516 B2    5/2015 Kent et al.
(Continued)

FOREIGN PATENT DOCUMENTS

| CN | 101272170 | 9/2008 |
|---|---|---|
| WO | WO 2006/000955 | 1/2006 |
| WO | WO 2012/040495 | 3/2012 |

OTHER PUBLICATIONS

Nan., L., et al. "RTS&CTS Exchange in wideband transmission;" IEEE 802.11-10/1066r2; Sep. 2010; pp. 1-8.

*Primary Examiner* — Afshawn Towfighi
(74) *Attorney, Agent, or Firm* — McClure, Qualey & Rodack, LLP

(57) ABSTRACT

A method of reducing the usable channel bandwidth and increasing the channel bandwidth at run time is provided. The method allows a receiving wireless communications device to inform its corresponding transmitting communications device to either increase, reduce, or maintain the number of usable narrow band channels for the succeeding frame exchange. In a wireless communications channel, channel reduction is accomplished by using a usable channel indicator in a response frame responding to the preceding receiving frame. The usable channel indicator is the means for the receiving communications device to inform the (Continued)

transmitting communications device the preferred narrow band channels that it deems having good channel characteristics.

18 Claims, 6 Drawing Sheets

(51) Int. Cl.
*H04L 1/16* (2006.01)
*H04L 5/00* (2006.01)
*H04W 72/04* (2009.01)
*H04W 84/12* (2009.01)

(56) References Cited

U.S. PATENT DOCUMENTS

| | | |
|---|---|---|
| 2008/0117931 A1 | 5/2008 | Beukema et al. |
| 2008/0212527 A1 | 9/2008 | Hosein et al. |
| 2012/0082040 A1 | 4/2012 | Gong et al. |

* cited by examiner

EMBODIMENT - BITMAP

EMBODIMENT 2 – MULTIPLE BITS

METHOD FOR DYNAMICALLY ADJUSTING CHANNEL BANDWIDTH IN WIRELESS COMMUNICATIONS SYSTEMS

CROSS REFERENCE TO RELATED APPLICATIONS

This application is a National Stage Application of PCT Application No. PCT/CN2013/089243, filed on Dec. 12, 2013, which claims priority under 35 U.S.C. §119 from U.S. Provisional Application No. 61/736,193, entitled "Method for Channel Expanding in OBSS," filed on Dec. 12, 2012; U.S. Provisional Application No. 61/767,878, entitled "Channel Access in ah OBSSs," filed on Feb. 22, 2013, the subject matter of which is incorporated herein by reference.

TECHNICAL FIELD

The disclosed embodiments relate generally to wireless network communications, and, more particularly, to dynamically adjust channel bandwidth in wireless communication systems.

BACKGROUND

IEEE 802.11 is a set of media access control (MAC) and physical layer (PHY) specification for implementing wireless local area network (WLAN) computer communication in the Wi-Fi (2.4, 3.6, 5, and 60 GHz) frequency bands. The standards and amendments provide the basis for wireless network products using the Wi-Fi frequency bands. IEEE 802.11ah is a new wireless networking standard from the IEEE 802.11 wireless networking standard family. The purpose of IEEE 802.11ah is to create large groups of stations that cooperate to share air medium while minimizing energy consumption. Apart from the conventional ISM bands of 2.4 GHz and 5 GHz, IEEE 802.11ah is set to dive into the unlicensed 900 MHz band as the widespread usage of Wi-Fi in 2.4 GHz ISM band has led to contention problems. The most prominent aspect of IEEE 802.11ah is the behavior of stations that are grouped to minimize contention on the air media.

While 2.4 GHz Wi-Fi commonly uses three 20 MHz channels (in the available 85 MHz of spectrum), the 802.11ah standard uses a more restricted 902-928 MHz band (in the United States). In Japan, the available band is within 916.5-927.5 MHz, with eleven 1 MHz channels. In China, the available band will be within 755-787 MHz, with thirty-two 1 MHz channels. The new 802.11ah standard allows twenty-six 1 MHz channels or thirteen 2 MHz channels. The PHY transmission in IEEE 802.11ah is an OFDM waveform consisting of 64 tones/sub-carriers that are spaced by 31.25 kHz. The modulations supported in IEEE 802.11ah include BPSK, QPSK and 16 to 256 QAM. IEEE 802.11ah also supports multi user multiple-input and multiple-output (MU-MIMO) and single user beam forming.

The new IEEE 802.11ah standard aims at providing a long-range Wi-Fi transmission. In addition, the prime use is intended to be in wireless sensor networking owing to power saving strategies. The devices operating in IEEE 802.11ah mode are believed to have long battery life and long network reach due to the propagation characteristics at below 1 GHz sub gigahertz spectrum. IEEE 802.11ah uses IEEE 802.11a/g specification that is down sampled to provide the 26 channels, each of them able to provide 100 Kbit/s throughput.

In an IEEE 802.11 wireless communications system that provides both conventional Wi-Fi service and IEEE 802.11ah service, a long-range basic service set (BSS) has a coverage area radius of up to one kilometer, which is a multiple of that of a short-range BSS. A long-range BSS may enclose and overlap spatially with several short-range BSSs. The long-range BSS occupies a narrow 1 or 2 MHz channel, while the short-range BSSs each occupies a wide 8 MHz channel, consisting of four 2 MHz channels. Different stations (STAs) are associated with different access points (APs) providing wireless services. An overlapping station STAO is associated with a long-range APL that is also within the coverage of a short-range BSS. A long-range station STAL is associated with the long range APL that is not within the coverage of the short-range BSSs. A short-range station STAS is associated with a short-range APS that is also within the coverage of the long-range BSS. The APSs and STASs will hear the traffic of the long-range BSSs and set up collision avoidance scheme accordingly. However, some of the APLs and STALs may not hear the traffic inside some of the short-range BSSs and would not set up collision avoidance scheme accordingly. As a result, the traffic in the long-range BSS may collide with the traffic in some of the short-range BSSs and cause data loss.

A solution is sought.

SUMMARY

A method of reducing the usable channel bandwidth and increasing the channel bandwidth at run time is provided.

A wireless communications channel comprises a plurality of narrow band channels. The transmitting communications device transmits a frame in a wireless communications channel that covers all the narrow band channels. The receiving communications device responds with a response frame. The response frame can have the same format and the same channel bandwidth as the received frame or have duplicate format. For duplicate format, the same narrow band frame is duplicated and transmitted over more than one narrow band channels.

The method disclosed in the application allows a receiving wireless communications device to inform its corresponding transmitting communications device to either increase, reduce, or maintain the number of usable narrow band channels for the succeeding frame exchange. In a wireless communications channel, channel reduction is accomplished by using a usable channel indicator in the response frame responding to the preceding received frame. The usable channel indicator is the means for the receiving communications device to inform the transmitting communications device the preferred narrow band channels that it deems having good channel characteristics. The receiving communications device can use SNR/SINR, RSSI, RSRP/RSRQ, PER (packet error rate), data traffic flow specific information, etc. to determine the usable narrow band channels.

In one embodiment, the usable channel indicator is a bitmap in an acknowledge frame (ACK) which covers the same channel bandwidth as the immediately preceding received frame. The bitmap indicates whether a narrow band channel of the wireless communications channel is still usable. Each bit in the bit map represents a corresponding narrow band channel.

In another embodiment, the usable channel indicator is a bit in duplicated narrow band acknowledge frames (ACKs). The duplicated narrow band acknowledge frames cover the same channel bandwidth as the immediately preceding received frame. Each bit in a duplicated narrow band acknowledge frame indicates whether the corresponding narrow band channel of the wireless communications channels is still usable.

In yet another embodiment, the usable channel is indicated by the number of corresponding duplicated narrow band acknowledge frames (ACKs) returned from the receiving communications device. For example, a transmitting frame has a channel bandwidth that covers eight narrow band channels. The receiving communication device determines that only four of the narrow band channels are usable, and returns duplicated narrow band acknowledge frames only on the four usable narrow band channels.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
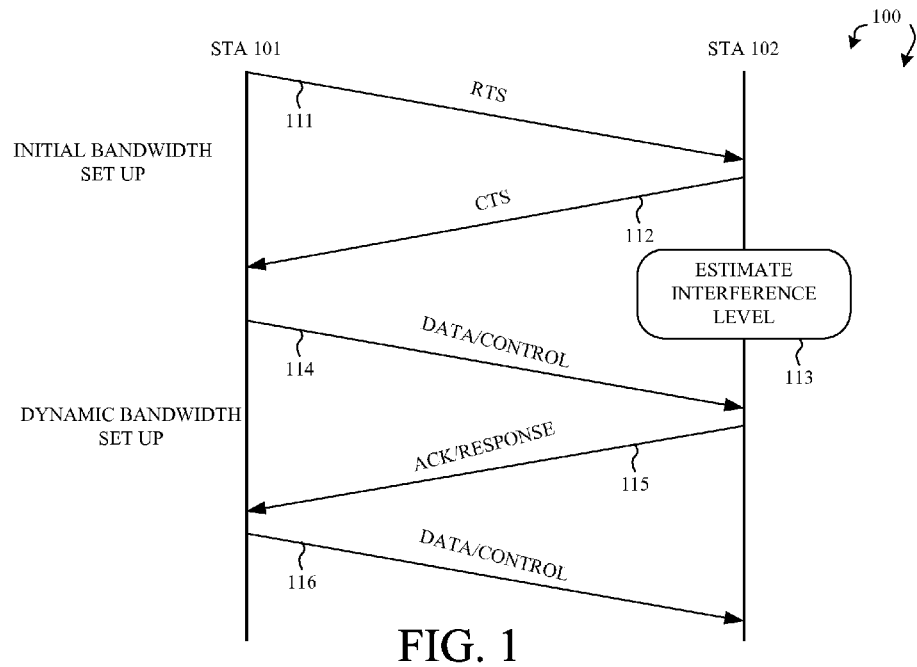
FIG. 1 illustrates a wireless communications network with dynamic channel bandwidth adjustment in accordance with one novel aspect.

FIG. 1 illustrates a wireless communications network 100 with dynamic channel bandwidth adjustment in accordance with one novel aspect. Wireless communications network 100 comprises a first wireless communications device (e.g., station STA 101) and a second wireless communications device (e.g., station STA 102). The wireless communications network 100, for example, may be a conventional Wi-Fi network or an IEEE 802.11ah network. STA 101 and STA 102 first perform initial bandwidth setup before on-going data communication. For example, carrier sense multiple access with collision avoidance (CSMA/CA) may be used to access the shared medium. In addition, request to send/clear to send (RTS/CTS) may optionally be used during collision avoidance to mediate access to the shared medium. The shared medium may be a wide band channel (e.g., 8 MHz) comprising more than one narrow band channels (e.g., four 2 MHz channels). In step 111, STA 101 sends a request to send (RTS) packet to STA 102. For example, duplicate RTS frames are sent by STA 101 on all narrow band channels. In step 112, STA 102 sends a clear to send (CTS) packet to STA 101. For example, duplicate CTS frames are sent on all usable narrow band channels. After the initial bandwidth setup, STA 101 exchanges frames with STA 102 by using the bandwidth indicated in the duplicated CTSs. Next, STA 101 and STA 102 perform dynamic bandwidth setup for exchanging data frames and/or control frames.

In step 114, STA 101 sends a first frame (e.g., a data frame or a control frame) to STA 102. The first frame is sent on a first channel having a first channel bandwidth determined based on a set of channel rules defined by the IEEE 802.11ah or other IEEE 802.11 standards (e.g., indicated in the duplicated CTSs). The first channel is a wide band channel comprising more than one narrow band channels. In step 115, STA 102 sends a second frame (e.g., a response frame) back to STA 101. The response frame is an acknowledge frame to the data frame, or a response frame to the control frame. Typically, the response frame is sent on a second channel having a second channel bandwidth, which is the same as the first channel bandwidth. However, network and channel conditions of the narrow band channels may vary over time, and some of the narrow band channels may no longer be usable during run time.

In one novel aspect, the response frame, e.g., in the frame header, includes a usable channel indicator that indicates which of the narrow band channels are usable during run time. Upon receiving the usable channel indicator, in step 116, STA 101 then transmits a subsequent third frame to STA 102 via a third channel having a third channel bandwidth, which is determined based on the usable channel indicator. In one example, in step 113, STA 102 estimates the channel condition, quality, or interference levels of the multiple narrow band channels and thereby determining which of the narrow band channels are deemed to have good channel characteristics. For example, the evaluation may be based on signal noise ratio (SNR), signal to interference plus noise ratio (SINR), received signal strength indicator (RSSI), reference signal received power or quality (RSRP/RSRQ), packet error rate (PER), and other data traffic flow specific information, etc. to determine the usable narrow band channels.

Figure 2:
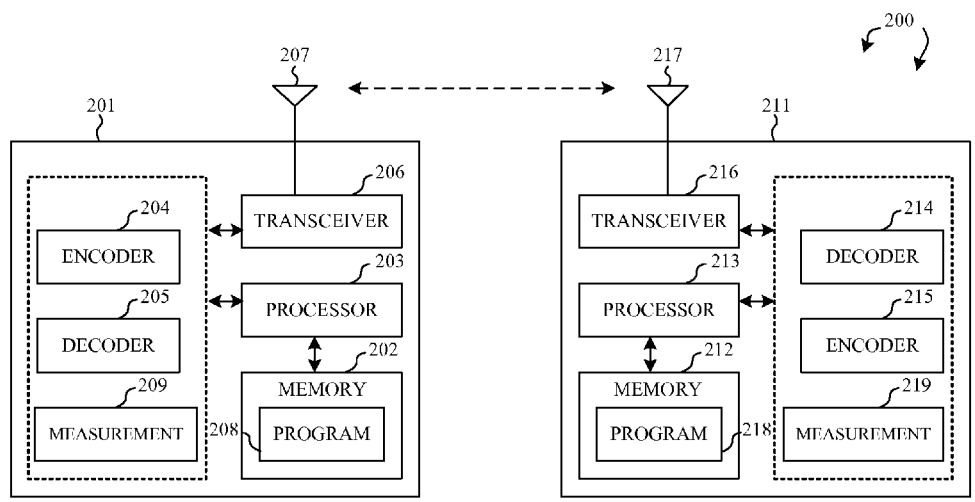
FIG. 2 is a simplified block diagram of a wireless station and a wireless relay agent in accordance with one novel aspect.

FIG. 2 is a simplified block diagram of wireless stations 201 and 211 in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antennae, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional modules to perform certain embodiments of the present invention. In the example of FIG. 2, wireless device 201 is a wireless communications station (e.g., a transmitting device) that includes an encoder 204 for encoding and transmitting a frame to device 211, a decoder 205 for receiving and decoding a frame from device 211, and a measurement module 209 for measuring channel qualities and estimating channel conditions. Wireless device 211 is another wireless communications station (e.g., a receiving device) includes a decoder 214 for receiving and decoding a frame from device 201, an encoder 215 for encoding and transmitting a frame to device 201, and a measurement module 219 for measuring channel qualities and estimating channel conditions. The different functional modules can be implemented by software, firmware, and hardware, or any combination thereof. The function modules, when executed by the processors 203 and 213 (e.g., via executing program codes 208 and 218), allow wireless stations 201 and 211 to perform certain embodiments of the present invention.

Figure 3:
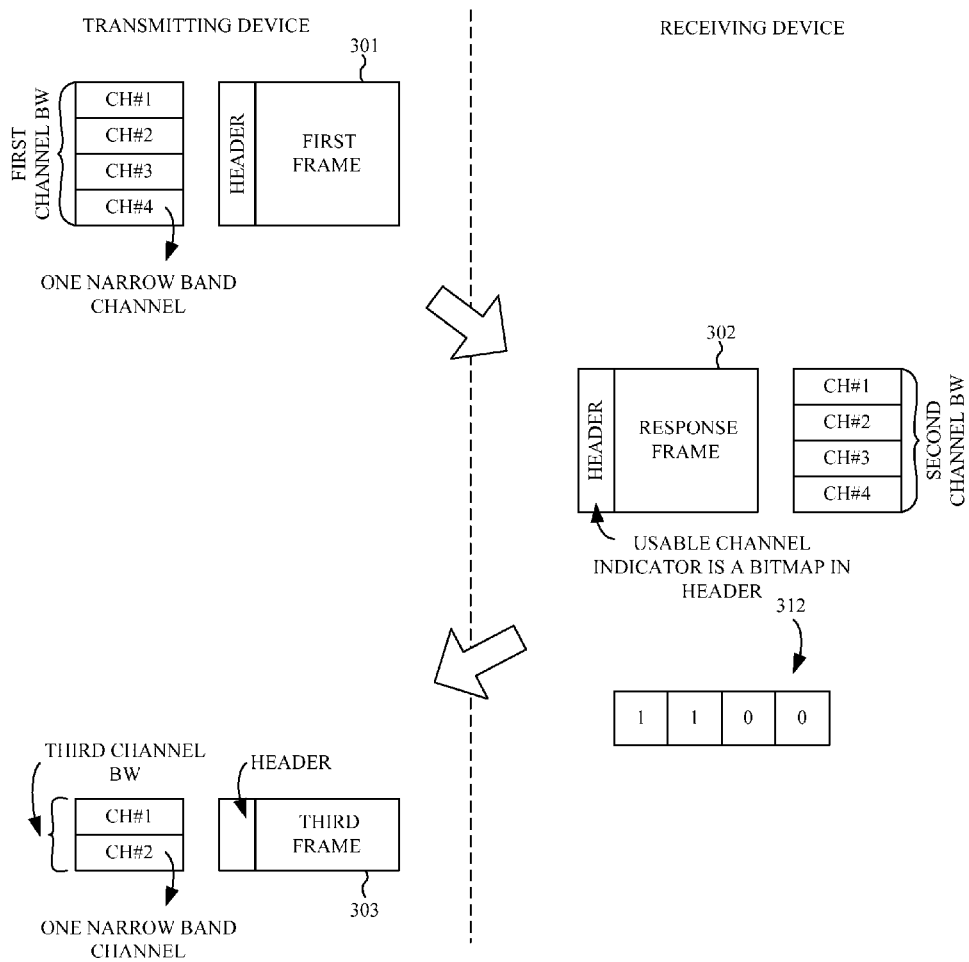
FIG. 3 is a diagram of one embodiment of reducing the usable channel bandwidth using a bitmap as usable channel indicator in a response frame.

FIG. 3 is a diagram of one embodiment of reducing the usable channel bandwidth using a bitmap as usable channel indicator in a response frame. In the example of FIG. 3, a transmitting device transmits a first frame 301 with a first channel bandwidth. The first frame is a data frame or a control frame. The first channel is a wide channel comprising more than one narrow band channels, e.g., channel 1 (CH#1), channel 2 (CH#2), channel 3 (CH#3), and channel 4 (CH#4). Each of the narrow band channels has a channel bandwidth of 1 to 2 MHz. A receiving device receives first frame 301, and in response sends a second frame 302, which is a response frame back to the transmitting device. If first frame 301 is a data frame, then response frame 302 is an acknowledgement frame. If first frame 301 is a control frame, then response frame 302 is a control frame response frame. Response frame 302 has a second channel bandwidth.

In accordance with the embodiment of FIG. 3, the receiving device sends response frame 302 with a second channel bandwidth, which is the same as the first channel bandwidth of the first frame 301. In addition, response frame 302 includes a bitmap 312 in its header, and bitmap 312 is used as the usable channel indicator. For example, since the second channel has four narrow band channels CH#1 to CH#4, bitmap 312 has four bits, and each bit indicates whether a corresponding narrow band channel is usable. In the example of FIG. 3, bitmap "1100" indicates that CH#1 and CH#2 are usable (indicated by bit "1"), while CH#3 and CH#4 are not usable (indicated by bit "0"). The transmitting device receives response frame 302 and transmits a third frame 303 with a third channel bandwidth. The third channel bandwidth is determined in accordance with usable channel indicator 312, which indicates that CH#3 and CH#4 are no longer usable. As a result, the third channel only comprises the usable narrow band channels CH#1 and CH#2. By using the usable channel indicator, e.g., bitmap 312, the channel bandwidth is dynamically reduced at run time to reduce data loss caused by unusable narrow band channels CH#3 and CH#4.

Figure 4:
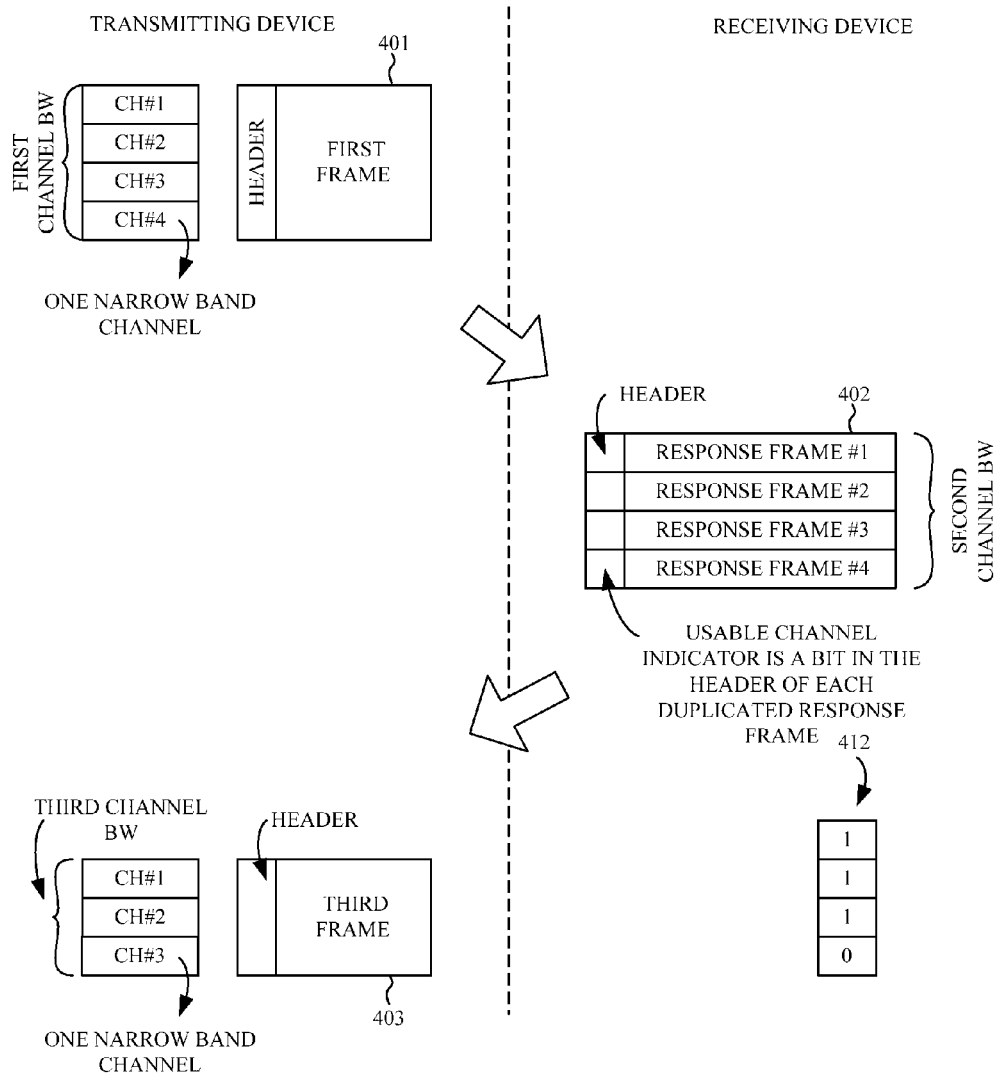
FIG. 4 is a diagram of one embodiment of reducing the usable channel bandwidth using multiple bits as usable channel indicator in each duplicated response frame.

FIG. 4 is a diagram of one embodiment of reducing the usable channel bandwidth using multiple bits as usable channel indicator in each duplicated response frame. In the example of FIG. 4, a transmitting device transmits a first frame 401 with a first channel bandwidth. The first frame is a data frame or a control frame. The first channel is a wide channel comprising more than one narrow band channels, e.g., channel 1 (CH#1), channel 2 (CH#2), channel 3 (CH#3), and channel 4 (CH#4). Each of the narrow band channels has a channel bandwidth of 1 or 2 MHz. A receiving device receives first frame 401, and in response sends a second frames 402, which is a response frame back to the transmitting device. If first frame 401 is a data frame, then response frame 402 is an acknowledgement (ACK) frame to the data frame. If first frame 401 is a control frame, then response frame 402 is a response frame to the control frame.

In accordance with the embodiment of FIG. 4, the receiving device sends response frame 402 with a second channel bandwidth, which is the same as the first channel bandwidth of first frame 401. In addition, response frame 402 comprises duplicated narrow-band response frames that covers the second channel bandwidth. Each narrow-band response frame includes a bit in its header, and the bits in all the narrow-band response frames together form a usable channel indicator 412. For example, since the second channel has four narrow band channels CH#1 to CH#4, the same as the first channel, response frame 402 comprises four duplicated narrow-band response frames #1-#4. Each narrow-band response frame #1-#4 includes one bit in its header, and each bit indicates whether a corresponding narrow band channel is usable.

In the example of FIG. 4, response frames #1-#3 all include a bit "1" in its header indicating that CH#1 to CH#3 are usable, while response frame #4 includes a bit "0" in its header indicating that CH#4 is not usable. The four bits "1", "1", "1", and "0" in the four narrow-band response frames #1-#4 together form the usable channel indicator 412. The transmitting device receives the narrow-band response frames and transmits a third frame 403 with a third channel bandwidth. The third channel bandwidth is determined in accordance with usable channel indicator 412, which indicates that CH#4 is no longer usable. As a result, the third channel only comprises the usable narrow band channels CH#1, CH#2, and CH#3. By using usable channel indicator 412, the channel bandwidth is dynamically reduced at run time to reduce data loss caused by unusable narrow band channel CH#4.

Figure 5A:
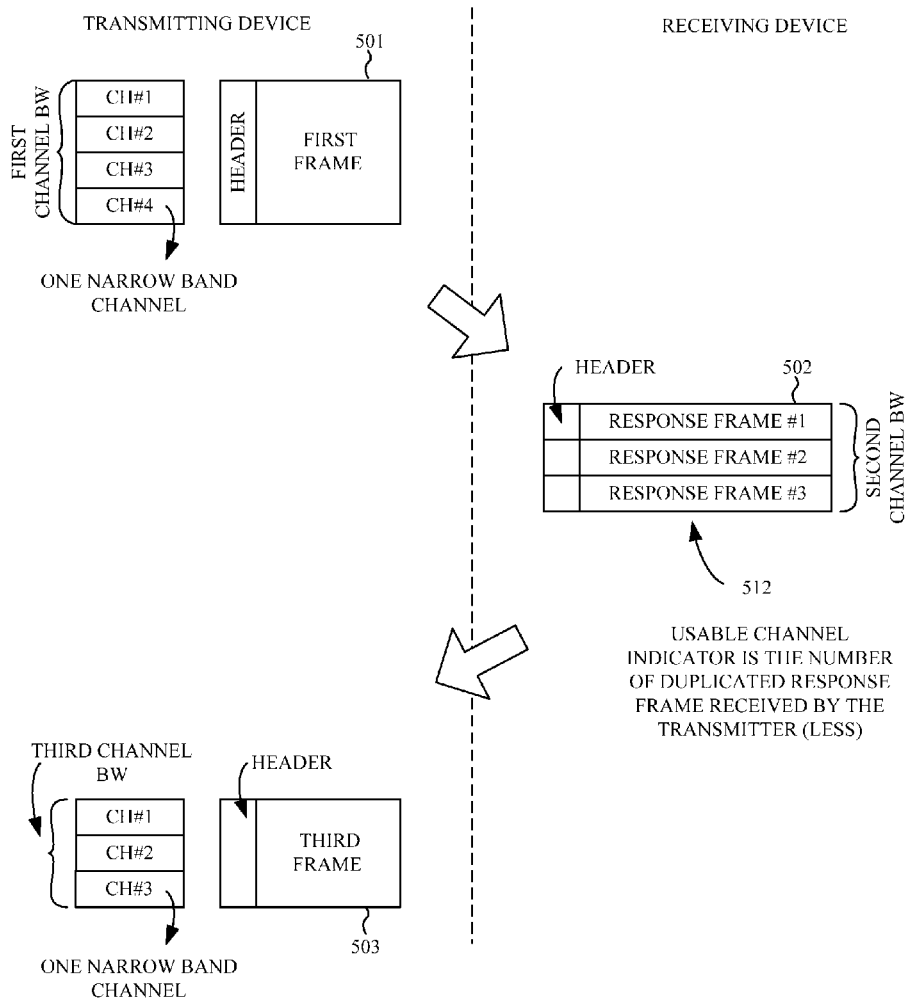
FIG. 5A is a diagram of one embodiment of reducing the usable channel bandwidth using the number of duplicated response frames.

FIG. 5A is a diagram of one embodiment of reducing the usable channel bandwidth using the number of duplicated response frames. In the example of FIG. 5A, a transmitting device transmits a first frame 501 with a first channel bandwidth. The first frame is a data frame or a control frame. The first channel is a wide channel comprising more than one narrow band channels, e.g., channel 1 (CH#1), channel 2 (CH#2), channel 3 (CH#3), and channel 4 (CH#4). Each of the narrow band channels has a channel bandwidth of 1 or 2 MHz. A receiving device receives first frame 501, and in response sends a second frames 502, which is a response frame back to the transmitting device. If first frame 501 is a data frame, then response frame 502 is an acknowledgement frame to the data frame. If first frame 501 is a control frame, then response frame 502 is a response frame to the control frame. Response frame 502 is sent on a second channel having a second channel bandwidth.

In accordance with the embodiment of FIG. 5A, the receiving device sends response frame 502 with a second channel bandwidth, which is less than the first channel bandwidth of the first frame 501. In addition, response frame 502 comprises one or more duplicated narrow-band response frames on the corresponding usable narrow band channels. The number of duplicated narrow-band response frames implicitly forms a usable channel indicator 512. For example, response frame 502 comprises three duplicated narrow-band response frames #1-#3. The number of duplicated narrow-band response frames, e.g., number three, indicates that three corresponding narrow band channels CH#1 to CH#3 are usable.

In the example of FIG. 5A, three duplicated narrow-band response frames #1-#3 indicating that CH#1 to CH#3 are usable, while the absence of response frame #4 indicates that CH#4 is not usable. The transmitting device receives the three duplicated narrow-band response frames and transmits a third frame 503 with a third channel bandwidth. The third channel bandwidth is determined in accordance with usable channel indicator 512, which indicates that CH#4 is no longer usable. As a result, the third channel only comprises the usable narrow band channels CH#1, CH#2, and CH#3. By using usable channel indicator 512, the channel bandwidth is dynamically reduced at run time to reduce data loss caused by unusable narrow band channel CH#4.

Figure 5B:
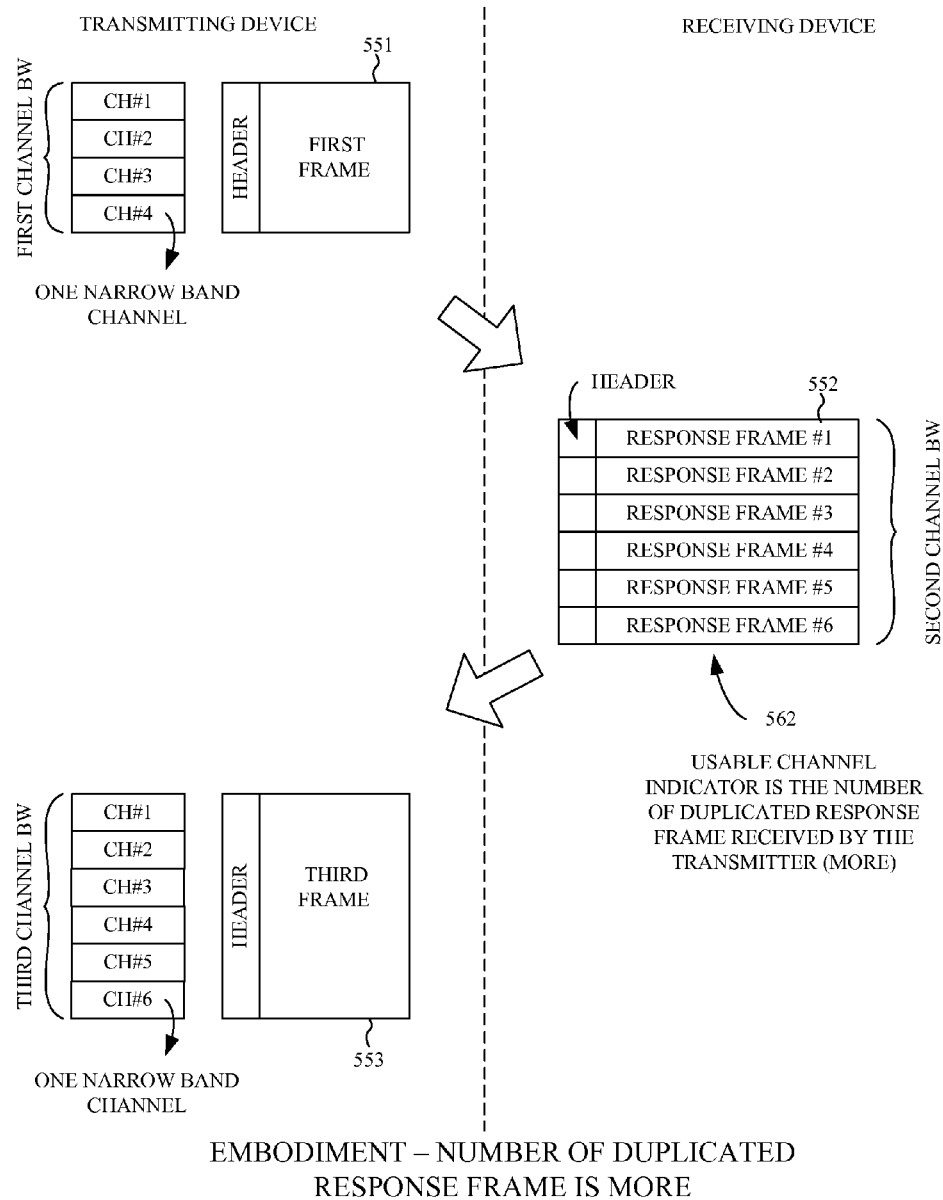
FIG. 5B illustrates one embodiment of increasing the usable channel bandwidth using the number of duplicated response frames.

FIG. 5B illustrates one embodiment of increasing the usable channel bandwidth using the number of duplicated response frames. In the example of FIG. 5B, a transmitting device transmits a first frame 551 with a first channel bandwidth. The first frame is a data frame or a control frame. The first channel is a wide channel comprising more than one narrow band channels, e.g., channel 1 (CH#1), channel 2 (CH#2), channel 3 (CH#3), and channel 4 (CH#4). Each of the narrow band channels has a channel bandwidth of 1 to 2 MHz. A receiving device receives first frame 551, and in response sends a second frames 552, which is a response frame back to the transmitting device. If first frame 551 is a data frame, then response frame 552 is an acknowledgement frame to the data frame. If first frame 551 is a control frame, then response frame 552 is a response frame to the control frame. Response frame 552 is sent on a second channel having a second channel bandwidth.

In accordance with the embodiment of FIG. 5B, the receiving device sends response frame 552 with a second channel bandwidth, which is more than the first channel bandwidth of the first frame 551. In addition, response frame 552 comprises one or more duplicated narrow-band response frames on corresponding usable narrow-band channels. The number of duplicated narrow-band response frames implicitly forms a usable channel indicator 562. For example, response frame 552 comprises six duplicated narrow-band response frames #1-#6. The number of duplicated narrow-band response frames, e.g., number six, indicates that six corresponding narrow band channels CH#1 to CH#6 are usable. This may happen when narrow band channels CH#5 and CH#6 are initially unusable, but later become usable when the network and channel condition changes over time.

In the example of FIG. 5B, six duplicated narrow-band response frames #1-#6 indicating that CH#1 to CH#6 are usable. The transmitting device receives the six duplicated narrow-band response frames and transmits a third frame 553 with a third channel bandwidth. The third channel bandwidth is determined in accordance with usable channel indicator 562, which indicates that narrow band channels CH#1 to CH#6 are all usable. As a result, the third channel comprises all the usable narrow band channels CH#1 to CH#6. By using usable channel indicator 562, the channel bandwidth is dynamically increased at run time to increase system throughput. Please note that the numbers of channels used according to the present invention can be 2, 4, 8, 16 or any other numbers. The above embodiments are exemplary only and any other suitable arrangement may be easily substituted therefor.

Figure 6:
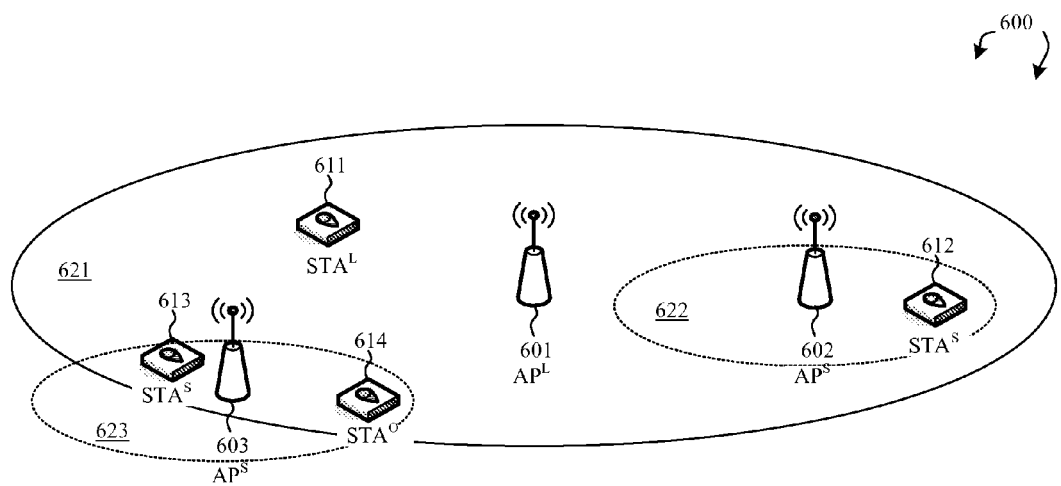
FIG. 6 illustrates one embodiment of dynamically adjusting channel bandwidth in an OBSS wireless communications network.

FIG. 6 illustrates one embodiment of dynamically adjusting channel bandwidth in an OBSS wireless communications network 600. OBSS network 600 comprises a plurality of access points (APs) and a plurality of stations (STAs). In such a network, a long-range basic service set (BSS) has a coverage area radius of up to one kilometer, which is a multiple of that of a short-range BSS. A long-range BSS may enclose and overlap spatially with several short-range BSSs. For example, long-range BSS 621 enclose and overlap spatially with short-range BSSs 622 and 623. The long-range BSS occupies a narrow 1 or 2 MHz channel, while the short-range BSSs each occupies a wide 2, 4, 8, or 16 MHz channel, consisting of more than one narrow band channels. Different STAs are associated with different APs providing wireless services.

In the example of FIG. 6, an overlapping station $STA^O$ is associated with a long-range $AP^L$ that is also within the coverage of a short-range BSS. A long-range station $STA^L$ is associated with the long range $AP^L$ that is not within the coverage of the short-range BSSs. A short-range station $STA^S$ is associated with a short-range $AP^S$ that is also within the coverage of the long-range BSS. For example, $STA^L$ 611 is a long-range station $STA^L$ associated with $AP^L$ 601. $STA^S$ 612 is a short-rang station $STA^S$ associated with short-range $AP^S$ 602. $STA^S$ 613 is a short-range station $STA^S$ associated with short-range $AP^S$ 603. Both $STA^S$ 612 and $STA^S$ 613 are also within the coverage of long range BSS 621. Overlapping station $STA^S$ 614 is associated with long-range $AP^L$ 601, but is also within the coverage of short-range BSS 623.

Taking short-range BSS 623 as an example, it occupies a wide channel, e.g., 8 MHz, which comprises four 2 MHz narrow band channels. One of the narrow band channels is a primary channel while the other three narrow band channels are secondary channels. If short range BSS 623 and long range BSS 621 share the primary channel, they can coexist according to predefined channel access rules. APS 603 and STAS 613 will hear the traffic of APL 601 and STAO 614 and setup a Network Allocation Vector (NAV) for collision avoidance scheme accordingly. However, APL 601 and STAO 614 on the secondary channels may not hear traffic or TXOP setup in the short-range BSS 623 sharing the primary channel and may interfere with the traffic in the short-range BSS 623. The long range BSS 621 on the secondary channels of the short range BSS 623 may not hear TXOP setup of the short range BSS 623 and will access channel according to CCA rules. As a result, the traffic in the long range BSS 621 occupies the secondary channels may collide with the traffic in the short range BSS 623 and cause data loss.

In accordance with one novel aspect, a short-range $STA^S$ receiver can estimate the interference level (e.g., SINR) of the secondary channels based on Rx statistics. Based on the interference level estimation, the short-range $STA^S$ can determine which of the secondary channels have intolerable interference and are thus unusable. During run time, an $STA^S$ transmitter starts transmitting a frame using the primary channel and all secondary channels available. An $STA^S$ receiver returns a usable channel indicator in a response frame. The usable channel indicator indicates which secondary channels are unusable so that the transmitter can avoid those secondary channels with high level of interference in the succeeding transmission. Subsequently, the $STA^S$ transmitter transmits data only on the secondary channels indicated as usable channels by the usable channel indicator.

Figure 7:
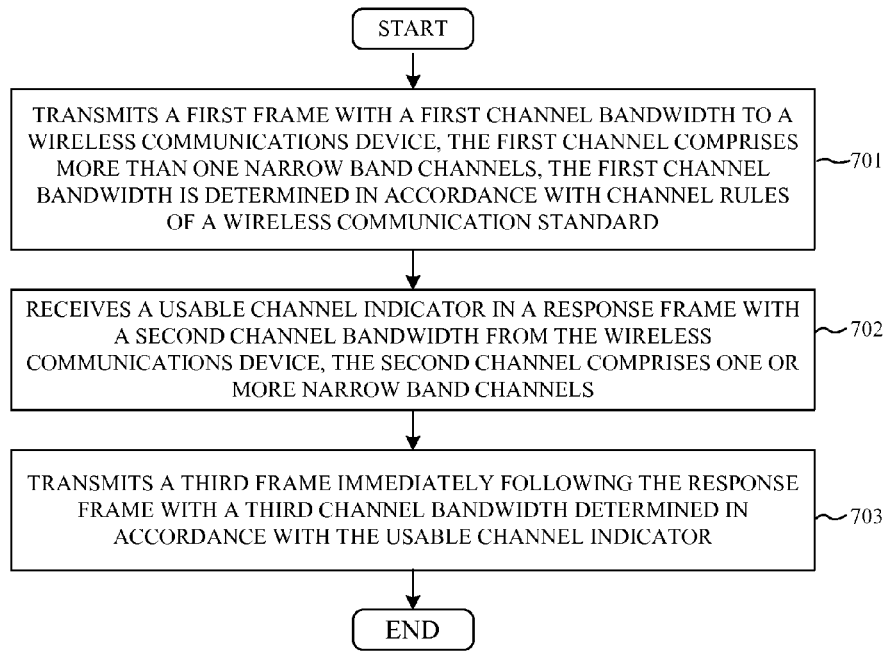
FIG. 7 is flow chart of a method of dynamically adjusting channel bandwidth using usable channel indicator in accordance with one novel aspect.

FIG. 7 is flow chart of a method of dynamically adjusting channel bandwidth using usable channel indicator in accordance with one novel aspect. In step 701, a wireless communications device transmits a first frame with a first channel bandwidth to a remote wireless communications device. The first channel comprises more than one narrow band channels, and the first channel bandwidth is determined in accordance with channel rules of a wireless communication standard. The channel rules may be based on SNR/SINR, RSSI, RSRP/RSRQ, PER (packet error rate), data traffic flow specific information etc. In step 702, the wireless communications device receives a usable channel indicator in a second frame, which is a response frame with a second channel bandwidth from the remote wireless communications device. The second channel comprises one or more narrow band channels. The usable channel indicator indicates which narrow band channels are usable. In step 703, the wireless communications device transmits a third frame following the response frame with a third channel bandwidth determined in accordance with the usable channel indicator in the response frame. By using the usable channel indicator, the channel bandwidth is dynamically adjusted at run time based on real time channel characteristics. And the transmission of the third frame can be immediately following the response frame.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method for dynamically adjusting a channel bandwidth in a wireless communications network, comprising:
   transmitting a first frame with a first channel bandwidth to a wireless communications device, wherein the first channel comprises more than one narrow band channels, and wherein the first channel bandwidth is determined in accordance with channel rules of a wireless communication standard;
   receiving a usable channel indicator in a second frame which is a response frame with a second channel bandwidth from the wireless communications device, wherein the second channel bandwidth of the second frame is more than the first channel bandwidth; and
   transmitting a third frame following the response frame with a third channel bandwidth determined in accordance with the usable channel indicator.

2. The method of claim 1, wherein the usable channel indicator in the response frame is a bitmap indicating whether each of the more than one narrow band channels is usable.

3. The method of claim 1, wherein the response frame comprises duplicated narrow band response frames covering the second channel bandwidth that is more than the first channel bandwidth.

4. The method of claim 3, wherein the usable channel indicator is a bit in each of the duplicated narrow band response frames, and wherein each bit indicates whether a corresponding narrow band channel of the more than one narrow band channels is usable.

5. The method of claim 1, wherein the response frame comprises duplicated narrow band response frames covering the second channel bandwidth that is different from the first channel bandwidth.

6. The method of claim 5, wherein the number of the duplicated narrow band response frames is the usable channel indicator.

7. The method of claim 6, wherein the number of the duplicated narrow band response frames is greater than the number of narrow band channels of the first frame when at least one narrow band channel which is initially unusable in the first channel becomes usable in the second channel.

8. The method of claim 1, wherein the first frame is a data frame, and wherein the second frame is an acknowledge frame of the data frame.

9. The method of claim 1, wherein the first frame is a control frame, and wherein the second frame is a control frame response frame.

10. A wireless communications device in a wireless communications network, the device comprises:
    a transmitter that transmits a first frame with a first channel bandwidth to a remote wireless communications device, wherein the first channel comprises more than one narrow band channels, and wherein the first channel bandwidth is determined in accordance with channel rules of a wireless communication standard; and
    a receiver that receives a usable channel indicator in a second frame which is a response frame with a second channel bandwidth from the remote wireless communications device, wherein the second channel comprises one or more narrow band channels, and wherein the second channel bandwidth of the second frame is more than the first channel bandwidth, and wherein the transmitter transmits a third frame following the response frame with a third channel bandwidth determined in accordance with the usable channel indicator.

11. The device of claim 10, wherein the usable channel indicator in the response frame is a bitmap indicating whether each of the more than one narrow band channels is usable.

12. The device of claim 10, wherein the response frame comprises duplicated narrow band response frames covering the second channel bandwidth that is more than the first channel bandwidth.

13. The device of claim 12, wherein the usable channel indicator is a bit in each of the duplicated narrow band response frames, and wherein each bit indicates whether a corresponding narrow band channel of the more than one narrow band channels is usable.

14. The device of claim 10, wherein the response frame comprises duplicated narrow band response frames covering the second channel bandwidth that is different from the first channel bandwidth.

15. The device of claim 14, wherein the number of the duplicated narrow band response frames is the usable channel indicator.

16. The device of claim 15, wherein the number of the duplicated narrow band response frames is greater than the number of narrow band channels of the first frame when at least one narrow band channel which is initially unusable in the first channel becomes usable in the second channel.

17. The device of claim 10, wherein the first frame is a data frame, and wherein the response frame is an acknowledge frame of the data frame.

18. The device of claim 10, wherein the first frame is a control frame, and wherein the response frame is a control frame response frame.

* * * * *